United States Patent Office 3,488,218
Patented Jan. 6, 1970

3,488,218
ELECTRODE FOR SECONDARY ELECTRIC CELLS
Otto Metzler, 33, Tulpenhofstrasse, Offenbach am Main, Germany; Gerhard Tiemann, 18, Elsenbornerstrasse, Cologne-Braunsfeld, Germany; and Wilhelm Heberer, 38, Liebigstrasse, Frankfurt am Main, Germany
No Drawing. Filed Dec. 29, 1965, Ser. No. 517,427
Claims priority, application Germany, Jan. 2, 1965, M 63,683
Int. Cl. H01m *35/30;* D06m *13/30;* C08g *53/20*
U.S. Cl. 117—201
3 Claims

ABSTRACT OF THE DISCLOSURE

Electrode for secondary electric cells, especially lead accumulators. The parts and admixtures made up of thermoplastic materials are provided with a thin, semi-permeable coating. Coating is effected by immersing such thermoplastic materials in a surface-active agent comprising lignin sulfonate.

---

Ample tests on plastic-bound electrodes, especially for lead accumulators, have shown that the synthetic plastic material to be introduced into or around the active paste in any discretionary manner and preferably serving as a paste carrier interfered with the acid diffusion and the convection, particularly after a certain number of cycles and after good initial results from the active paste.

The object of the present invention is to treat the interconnected or even loose plastic particles disposed in or around the active paste, or the surfaces of such plastic particles, respectively, in such a manner as to obtain capillarity, so that any interference with acid diffusion and convection is eliminated at least during the expected duration of life of such an electrode.

This object is attained according to the present invention by the provision of a positive or negative electrode for secondary electric cells, especially lead accumulators, wherein all the parts and admixtures chiefly consisting of thermoplastic materials are provided with an extremely thin semipermeable coating prior to being employed in the electrochemical process, said coating being obtained by the immersion of said parts and admixtures in an agent providing ionic conductivity and reducing the surface stress, and by subsequent drying.

The agent producing ionic conductivity may consist, for example, of three parts by weight of water and one part by weight of uncondensed lignin sulphonate exerting an excellent wetting action, and the result obtained by this agent can be referred to as surface ionization.

Thus, for example, polyethylene or polypropylene fibers to be incorporated in the active paste are previously wetted and then dried. But also the plastic particles used to form a finely distributed carrier structure within the active paste are wetted and dried in the aforedescribed manner either prior or subsequent to their gelation. This method is also adapted, for example, for the pre-treatment of porous plastic beds sintered together with the discharge grid and also of plastic tubes. It is of course also advantageous to add the fibers prepared according to the invention to the filling material of conventional tube plates.

The invention will be more clearly illustrated by the following examples.

EXAMPLE I

For a starter plate (positive or negative respectively) of normal size the weight of the active paste was fixed to 90 g. To this quantity of active paste 0.9 g. of polypropylene fibers having a length of about 3 mm. and a diameter of about 14 microns were added after previous immersion in a wetting agent consisting of three parts by weight of water and one part by weight of uncondensed lignin sulphonate, and subsequent drying. The capillary action thus produced resulted in a mass utilization considerably increased with respect to conventional plates, which is due to a considerably more intensive acid transport relative to the available active paste.

EXAMPLE II

A discharge and paste carrier consisting of a known starter grid and of a polyethylene bed sintered together with the latter was immersed in a wetting agent composed of three parts by weight of water and one part by weight of uncondensed lignin sulphonate and subsequently dried, before being filled with about 85 g. of active paste.

The plates obtained by this method, too, met all specified standards in spite of the low mass weight. It should be noted as important that self-discharge was found to be extremely low in the cells manufactured in accordance with the above examples.

We claim:
1. A positive or negative electrode for secondary electric cells, wherein all the parts and admixtures chiefly consisting of thermoplastic materials are provided with an extremely thin semipermeable coating prior to being employed in the electrochemical process, said coating being obtained by the immersion of said parts and admixtures in an agent containing a lignin sulfonate and providing ionic conductivity and reducing the surface stress, and by subsequent drying.
2. An electrode as claimed in claim 1, wherein said agent consists of three parts by weight of water and one part by weight of uncondensed lignin sulphonate.
3. An electrode as claimed in claim 1, wherein said thermoplastic materials comprise polyethylene or polypropylene fibres, said coating having been obtained by immersing said thermoplastic materials in an aqueous solution of uncondensed lignin sulphonate and then drying.

References Cited

UNITED STATES PATENTS

| | | | |
|---|---|---|---|
| 2,178,680 | 11/1939 | Daily | 136—26 |
| 2,887,522 | 5/1959 | MacKenzie | 136—34 X |
| 2,977,401 | 3/1961 | Marsal et al. | 136—120 |

ALFRED L. LEAVITT, Primary Examiner

CHARLES R. WILSON, Assistant Examiner

U.S. Cl. X.R.

117—138.8, 165; 136—26